United States Patent
Yanagida et al.

(10) Patent No.: US 8,046,126 B2
(45) Date of Patent: Oct. 25, 2011

(54) COOLING DEVICE, CONTROL METHOD OF COOLING DEVICE, AND ABNORMALITY SPECIFICATION METHOD

(75) Inventors: Eiji Yanagida, Okazaki (JP); Tetsuhiro Tsuchie, Anjo (JP)

(73) Assignees: Toyota Jidosha Kabushiki Kaisha, Toyota-shi (JP); Aisin Aw Co., Ltd., Anjo-shi (JP)

( * ) Notice: Subject to any disclaimer, the term of this patent is extended or adjusted under 35 U.S.C. 154(b) by 1101 days.

(21) Appl. No.: 11/792,314

(22) PCT Filed: Mar. 10, 2006

(86) PCT No.: PCT/JP2006/305309
§ 371 (c)(1),
(2), (4) Date: Jun. 5, 2007

(87) PCT Pub. No.: WO2006/095929
PCT Pub. Date: Sep. 14, 2006

(65) Prior Publication Data
US 2008/0109129 A1 May 8, 2008

(30) Foreign Application Priority Data
Mar. 11, 2005 (JP) .................... 2005-068852

(51) Int. Cl.
*F04B 49/00* (2006.01)
(52) U.S. Cl. ............ 701/29; 701/36; 417/1; 417/13; 417/14; 417/281; 165/200; 165/266
(58) Field of Classification Search ........ 701/1, 22, 701/29, 31, 36; 165/200, 279, 297, 300; 180/65.1, 65.21, 65.27; 123/491; 184/104.1; 374/1, 141, 145; 73/114.34; 417/32, 231, 417/278, 279, 321, 372
See application file for complete search history.

(56) References Cited

U.S. PATENT DOCUMENTS

| | | | | |
|---|---|---|---|---|
| 4,531,495 A | * | 7/1985 | Yamato et al. | 123/479 |
| 5,036,803 A | * | 8/1991 | Nolting et al. | 123/41.1 |
| 5,063,513 A | * | 11/1991 | Shank et al. | 701/36 |
| 5,217,085 A | * | 6/1993 | Barrie et al. | 184/104.1 |
| 5,309,730 A | * | 5/1994 | Strand et al. | 62/228.4 |
| 5,390,632 A | * | 2/1995 | Ikebe et al. | 123/41.02 |
| 5,415,603 A | * | 5/1995 | Tuzuki et al. | 477/5 |
| 5,529,114 A | * | 6/1996 | Hall et al. | 165/41 |
| 5,666,807 A | * | 9/1997 | Bianchetta | 60/329 |
| 5,880,361 A | * | 3/1999 | Taniguchi | 73/114.34 |

(Continued)

FOREIGN PATENT DOCUMENTS

EP 1 396 370 A1 3/2004

(Continued)

*Primary Examiner* — Jack Keith
*Assistant Examiner* — Jonathan M Dager
(74) *Attorney, Agent, or Firm* — Kenyon & Kenyon LLP

(57) ABSTRACT

The start control is repeatedly performed for an oil pump that pressure feeds the flow of oil in a motor cooling system. This control is repeated for every specified rise in motor temperature (e.g., every 10° C.) from an initial starting temperature. This arrangement increases the potential for a successful start-up of the oil pump even when the oil has a high viscosity due to a relatively low outside air temperature. In the event of a failed start-up of the oil pump by repeated starting, the start control determines an abnormality exists in the oil pump or its power supply if an outside air temperature is greater than a reference temperature. This arrangement effectively eliminates incorrect detection of an abnormality in the oil pump or its power supply.

6 Claims, 3 Drawing Sheets

U.S. PATENT DOCUMENTS

| | | | |
|---|---|---|---|
| 5,904,126 A * | 5/1999 | McKay et al. | 123/196 S |
| 6,016,774 A * | 1/2000 | Bokkers et al. | 123/41.1 |
| 6,200,021 B1 * | 3/2001 | Mitsutani et al. | 374/1 |
| 6,216,645 B1 * | 4/2001 | Bobretzky et al. | 123/41.15 |
| 6,377,880 B1 * | 4/2002 | Kato et al. | 701/29 |
| 6,725,813 B1 * | 4/2004 | Boyer | 123/41.44 |
| 6,987,373 B2 * | 1/2006 | Kagami et al. | 318/471 |
| 7,546,184 B2 * | 6/2009 | Meltser et al. | 701/19 |
| 2002/0094277 A1 * | 7/2002 | Gaudet et al. | 417/44.1 |
| 2002/0162537 A1 * | 11/2002 | Smith et al. | 123/446 |
| 2002/0195068 A1 * | 12/2002 | Ichinose et al. | 123/41.14 |
| 2003/0016498 A1 * | 1/2003 | Kurokawa et al. | 361/699 |
| 2003/0143084 A1 * | 7/2003 | Repple et al. | 417/292 |
| 2004/0007628 A1 * | 1/2004 | Paul et al. | 236/78 D |
| 2004/0063539 A1 * | 4/2004 | Endo et al. | 477/45 |
| 2004/0103862 A1 * | 6/2004 | Aidnik | 123/41.29 |
| 2004/0134693 A1 * | 7/2004 | Yamagishi et al. | 180/65.1 |
| 2004/0213676 A1 * | 10/2004 | Phillips et al. | 417/44.11 |
| 2004/0232252 A1 * | 11/2004 | Paul et al. | 237/28 |
| 2005/0039715 A1 * | 2/2005 | Young et al. | 123/142.5 R |
| 2005/0124457 A1 * | 6/2005 | Nakamori et al. | 477/3 |
| 2005/0199193 A1 * | 9/2005 | Hutchins | 123/41.08 |
| 2005/0228577 A1 * | 10/2005 | Wakahara et al. | 701/114 |
| 2006/0021358 A1 * | 2/2006 | Nallapa | 62/126 |
| 2010/0170954 A1 * | 7/2010 | Young et al. | 237/12.3 C |

FOREIGN PATENT DOCUMENTS

| | | |
|---|---|---|
| JP | 04-145801 | 5/1992 |
| JP | 2000-142434 A | 5/2000 |
| JP | 2000-227150 | 8/2000 |

* cited by examiner

COOLING DEVICE, CONTROL METHOD OF COOLING DEVICE, AND ABNORMALITY SPECIFICATION METHOD

This is a 371 national phase application of PCT/JP2006/305309 filed 10 Mar. 2006, which claims priority to Japanese Patent Application No. 2005-068852 filed 11 Mar. 2005, the contents of which are incorporated herein by reference.

TECHNICAL FIELD

The present invention relates to a cooling device for a motor, a control method of the cooling device, and a method of abnormality specification at a start of the cooling device. More specifically the invention pertains to a cooling device that supplies a flow of cooling oil to cool down a motor that is mounted on a vehicle and is driven to output driving power, as well as to a control method of the cooling device and an abnormality specification method of specifying an abnormality arising at a start of the cooling device.

BACKGROUND ART

One proposed cooling device drives an electric oil pump to supply a flow of oil as a driving source of a transmission to a radiator and cool down the oil flow when the temperature of the oil flow reaches or exceeds a preset temperature level (see, for example, Japanese Patent Laid-Open Gazette No. 2000-227150). In this prior art structure, the motor is arranged extremely near to a torque converter located with the transmission in one identical housing. Cooling the oil flow accordingly prevents a temperature rise of the motor.

DISCLOSURE OF THE INVENTION

In the prior art cooling device that cools down the motor with the oil flow cooled through heat exchange with the outside air via the radiator, at the extremely low outside air temperature, the oil in the radiator has the low temperature and the high viscosity. The high viscosity of the oil flow may interfere with a successful start-up of the electric oil pump. The failed start-up of the electric oil pump naturally leads to failed cooling of the motor. The cooling device may be designed to give notification of an abnormality of the electric pump in response to a failed start-up. Even when the failed start-up of the electric oil pump is caused by the low outside air temperature, the prior art cooling device gives wrong notification of an abnormality of the normal electric oil pump.

The cooling device and the cooling device control method of the invention thus aim to heighten the potential for a successful start-up of a pressure feed unit, such as an electric oil pump that pressure feeds a flow of cooling oil. The cooling device, the cooling device control method, and the abnormality specification method of the invention aim to adequately specify an abnormality arising in a pressure feed unit, such as an electric oil pump that pressure feeds a flow of cooling oil.

In order to attain at least part of the above and the other related objects, the cooling device of the invention, the control method of cooling device, and the abnormality specification method have the configurations discussed below.

A first cooling device of the invention is a cooling device that supplies a flow of cooling oil to cool down a motor mounted on a vehicle and driven to output driving power. The first cooling device includes: a heat exchange unit that cools down the flow of cooling oil through heat exchange with outside air; a pressure feed unit that is provided in a cooling oil circulation path formed between the motor and the heat exchange unit to pressure feed the flow of cooling oil and circulate the flow of cooling oil through the cooling oil circulation path; a motor temperature measurement unit that measures temperature of the motor; and a start control module that performs a start-up control for a start of the pressure feed unit at a rise in measured temperature of the motor to a preset starting temperature and, in the event of a failed start-up of the pressure feed unit, repeats the start-up control up to a predetermined number of times at every rise in measured temperature of the motor to one of multiple different temperatures, which are higher than the preset starting temperature, until a successful start-up of the pressure feed unit.

At a rise in measured temperature of the motor driven to output the driving power to the preset starting temperature, the first cooling device of the invention performs the start-up control for a start of the pressure feed unit, which is provided in the cooling oil circulation path formed between the motor and the heat exchange unit for cooling down the flow of cooling oil through heat exchange with the outside air to pressure feed the flow of cooling oil and circulate the flow of cooling oil through the cooling oil circulation path. In the event of a failed start-up of the pressure feed unit, the first cooling device repeats the start-up control up to the predetermined number of times at every rise in measured temperature of the motor to one of multiple different temperatures, which are higher than the preset starting temperature, until a successful start-up of the pressure feed unit. In the event of the failed start-up of the pressure feed unit, the start-up control is repeated up to the predetermined number of times. This arrangement heightens the potential for a successful start-up of the pressure feed unit, compared with the conventional cooling device that tries start-up of the pressure feed unit only once, thus effectively cooling down the motor.

In the first cooling device of the invention, the multiple different temperatures higher than the preset starting temperature may have temperature differences of a preset temperature interval. The cooling device performs the start-up control for a start of the pressure feed unit at the timings of rise in measured temperature of the motor by every preset temperature interval. This heightens the potential for a successful start-up of the pressure feed unit.

In one preferable application of the first cooling device of the invention, the start control module gives notification of an abnormality in the event of the failed start-up of the pressure feed unit by the predetermined number of repetitions of the start-up control. This arrangement gives adequate notification of an abnormality, compared with the conventional cooling device that tries a start-up of the pressure feed unit only once and gives notification of an abnormality in response to a failed start-up of the pressure feed unit. In one preferable embodiment of this application, the first cooling device further includes an outside air temperature measurement unit that measures outside air temperature. The start control module does not give notification of an abnormality even in the event of the failed start-up of the pressure feed unit by the predetermined number of repetitions of the start-up control, when the measured outside air temperature is lower than a preset low reference temperature. The first cooling device of this embodiment does not give notification of an abnormality of the pressure feed unit when a failed start-up of the pressure feed unit is caused by the high viscosity of the cooling oil at the low outside air temperature. This arrangement thus effectively eliminates wrong notification of an abnormality of the normal pressure feed unit.

A second cooling device of the invention is a cooling device that supplies a flow of cooling oil to cool down a motor mounted on a vehicle and driven to output driving power. The second cooling device includes: a heat exchange unit that cools down the flow of cooling oil through heat exchange with outside air; a pressure feed unit that is provided in a cooling oil circulation path formed between the motor and the heat exchange unit to pressure feed the flow of cooling oil and circulate the flow of cooling oil through the cooling oil circulation path; a motor temperature measurement unit that measures temperature of the motor; an outside air temperature measurement unit that measures outside air temperature; a start control module that performs a start-up control for a start of the pressure feed unit at a rise in measured temperature of the motor to a preset starting temperature; and an abnormality specification module that, in the event of a failed start-up of the pressure feed unit by the start-up control of said start control module, specifies occurrence of an abnormality at the measured outside air temperature of not lower than a preset low reference temperature, while not specifying the occurrence of an abnormality at the measured outside air temperature of lower than the preset low reference temperature.

At a rise in measured temperature of the motor driven to output the driving power to the preset starting temperature, the second cooling device of the invention performs the start-up control for a start of the pressure feed unit, which is provided in the cooling oil circulation path formed between the motor and the heat exchange unit for cooling down the flow of cooling oil through heat exchange with the outside air to pressure feed the flow of cooling oil and circulate the flow of cooling oil through the cooling oil circulation path. In the event of a failed start-up of the pressure feed unit by the start-up control, the second cooling device specifies the occurrence of an abnormality at the measured outside air temperature of not lower than the preset low reference temperature, while not specifying the occurrence of an abnormality at the measured outside air temperature of lower than the preset low reference temperature. The second cooling device of the invention effectively detects an abnormality of the pressure feed unit that causes a failed start-up of the pressure feed unit, but does not ascribe a failed start-up of the pressure feed unit caused by the high viscosity of the cooling oil at the low outside air temperature to an abnormality of the pressure feed unit. This arrangement thus effectively eliminates wrong detection of the abnormality of the normal pressure feed unit.

The cooling device control method of the invention is a cooling device control method of controlling a cooling device that includes: a heat exchange unit that cools down a flow of cooling oil through heat exchange with outside air; and a pressure feed unit that is provided in a cooling oil circulation path formed between a motor, which is driven to output driving power of a vehicle, and the heat exchange unit to pressure feed the flow of cooling oil and circulate the flow of cooling oil through the cooling oil circulation path. The cooling device control method performs a start-up control for a start of the pressure feed unit at a rise in measured temperature of the motor to a preset starting temperature and, in the event of a failed start-up of the pressure feed unit, repeats the start-up control up to a predetermined number of times at every rise in measured temperature of the motor to one of multiple different temperatures, which are higher than the preset starting temperature, until a successful start-up of the pressure feed unit.

At a rise in measured temperature of the motor driven to output the driving power to the preset starting temperature, the cooling device control method of the invention performs the start-up control for a start of the pressure feed unit, which is provided in the cooling oil circulation path formed between the motor and the heat exchange unit for cooling down the flow of cooling oil through heat exchange with the outside air to pressure feed the flow of cooling oil and circulate the flow of cooling oil through the cooling oil circulation path. In the event of a failed start-up of the pressure feed unit, the cooling device control method repeats the start-up control up to the predetermined number of times at every rise in measured temperature of the motor to one of multiple different temperatures, which are higher than the preset starting temperature, until a successful start-up of the pressure feed unit. In the event of the failed start-up of the pressure feed unit, the start-up control is repeated up to the predetermined number of times. This arrangement heightens the potential for a successful start-up of the pressure feed unit, compared with the conventional cooling device control method that tries start-up of the pressure feed unit only once, thus effectively cooling down the motor.

In the cooling device control method of the invention, the multiple different temperatures higher than the preset starting temperature may have temperature differences of a preset temperature interval. The cooling device performs the start-up control for a start of the pressure feed unit at the timings of rise in measured temperature of the motor by every preset temperature interval. This heightens the potential for a successful start-up of the pressure feed unit.

In one preferable application, the cooling device control method specify occurrence of an abnormality in the event of the failed start-up of the pressure feed unit by the predetermined number of repetitions of the start-up control. This arrangement gives adequate notification of an abnormality, compared with the conventional cooling device control method that tries a start-up of the pressure feed unit only once and gives notification of an abnormality in response to a failed start-up of the pressure feed unit. In one preferable embodiment of this application, the cooling device control method does not specify the occurrence of an abnormality even in the event of the failed start-up of the pressure feed unit by the predetermined number of repetitions of the start-up control, when a measured outside air temperature is lower than a preset low reference temperature. The cooling device control method of this embodiment does not give notification of an abnormality of the pressure feed unit when a failed start-up of the pressure feed unit is caused by the high viscosity of the cooling oil at the low outside air temperature. This arrangement thus effectively eliminates wrong notification of an abnormality of the normal pressure feed unit.

An abnormality specification method of the invention is an abnormality specification method of specifying an abnormality at a start of a cooling device. The cooling device including a heat exchange unit that cools down a flow of cooling oil through heat exchange with outside air; and a pressure feed unit that is provided in a cooling oil circulation path formed between a motor, which is driven to output driving power of a vehicle, and the heat exchange unit to pressure feed the flow of cooling oil and circulate the flow of cooling oil through the cooling oil circulation path. The abnormality specification method includes the steps of: performing a start-up control for a start of the pressure feed unit at a rise in measured temperature of the motor to a preset starting temperature; and in the event of a failed start-up of the pressure feed unit by the start-up control, specifying occurrence of an abnormality at a measured outside air temperature of not lower than a preset low reference temperature, while not specifying the occurrence of an abnormality at the measured outside air temperature of lower than the preset low reference temperature.

The abnormality specification method of the invention specified an abnormality at a start of the cooling device. The abnormality specification method performs the start-up control for a start of the pressure feed unit at a rise in measured temperature of the motor to the preset starting temperature. In the event of a failed start-up of the pressure feed unit by the start-up control, the abnormality specification method specifies the occurrence of an abnormality at the measured outside air temperature of not lower than the preset low reference temperature, while not specifying the occurrence of an abnormality at the measured outside air temperature of lower than the preset low reference temperature. The abnormality specification method of the invention effectively detects an abnormality of the pressure feed unit that causes a failed start-up of the pressure feed unit, but does not ascribe a failed start-up of the pressure feed unit caused by the high viscosity of the cooling oil at the low outside air temperature to an abnormality of the pressure feed unit. This arrangement thus effectively eliminates wrong detection of the abnormality of the normal pressure feed unit.

BEST MODES OF CARRYING OUT THE INVENTION

Figure 1:
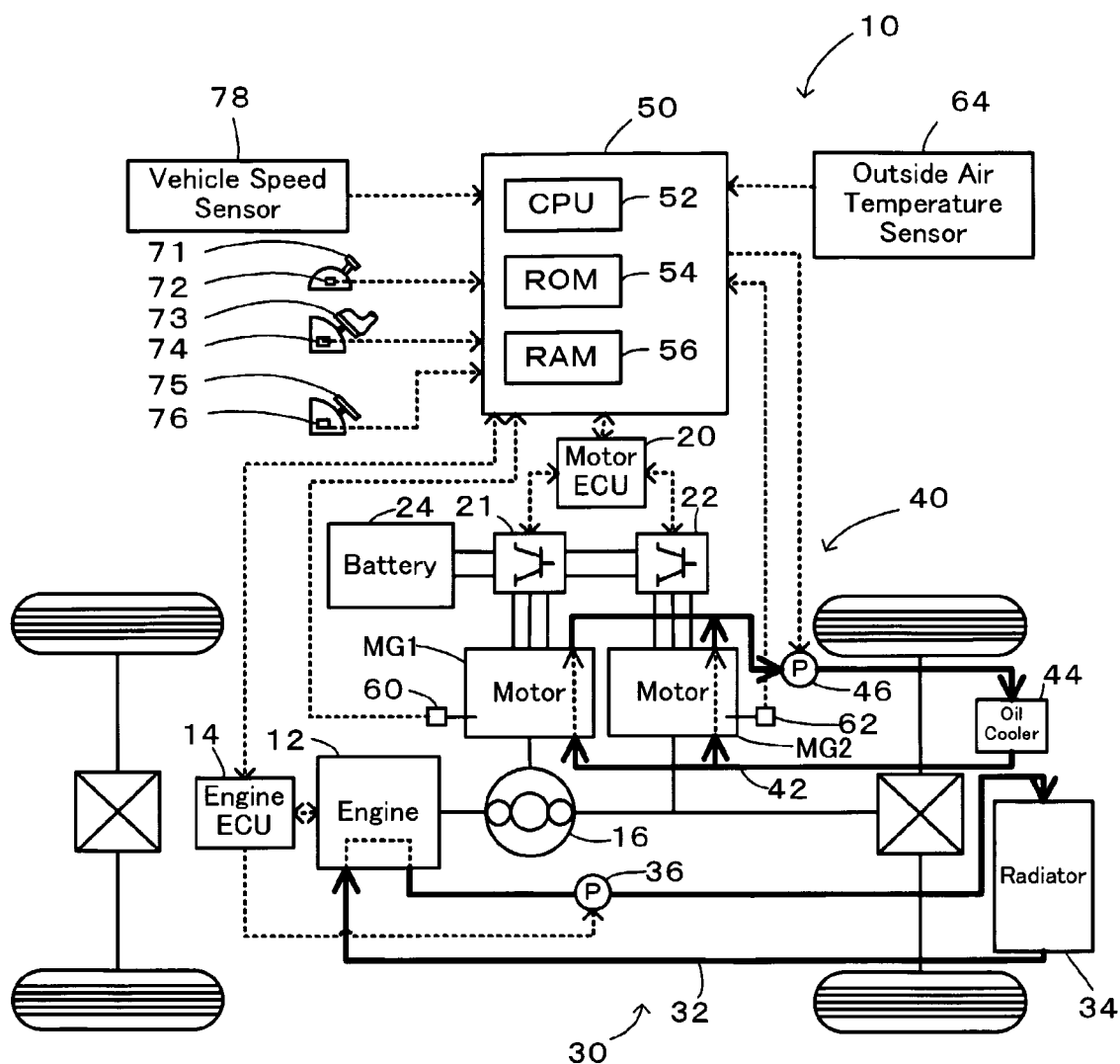
FIG. 1 schematically illustrates the configuration of a hybrid vehicle equipped with a cooling device for motors in one embodiment of the invention.

One mode of carrying out the invention is discussed below as a preferred embodiment. FIG. 1 schematically illustrates the configuration of a hybrid vehicle 10 equipped with a cooling device for motors in one embodiment of the invention. The hybrid vehicle 10 of the embodiment has an engine 12 that is driven under operation control of an engine electronic control unit 14 (engine ECU 14), a planetary gear mechanism 16 that includes a carrier connected to a crankshaft of the engine 12 and a ring gear connected to a driveshaft linked to an axle of front wheels, a motor MG1 that has a rotating shaft connected to a sun gear of the planetary gear mechanism 16 and has power generation capability, and a motor MG2 that has a rotating shaft connected to the driveshaft and has power generation capability. The hybrid vehicle 10 of the embodiment also has an engine cooling circulation system 30 that includes a radiator 34 and a cooling water pump 36, which is driven to circulate a flow of cooling water through a cooling water circulation path 32 between the radiator 34 and the engine 12, a motor cooling circulation system 40 that cools down a flow of oil as a lubricating/cooling medium for lubrication and cooling of the motors MG1 and MG2, and a hybrid electronic control unit 50 that controls the operations of the whole hybrid vehicle 10. The motors MG1 and MG2 are driven in combination with charge and discharge of a battery 24 and are under control of a motor electronic control unit 20 (motor ECU 20). The motor ECU 20 performs switching control of switching elements included in inverters 21 and 22 as respective driving circuits of the motors MG1 and MG2.

The motor cooling circulation system 40 includes an oil cooler 44 that is located in a front portion of the hybrid vehicle 10 and cools down the flow of oil through heat exchange with the outside air, an oil circulation path 42 that connects the motors MG1 and MG2 in parallel with the oil cooler 44 and circulates the flow of oil between the oil cooler 44 and the motors MG1 and MG2, and an oil pump 46 that pressure feeds the oil flow from the motors MG1 and MG2 to the oil cooler 44 to circulate the oil flow through the oil circulation path 42.

The hybrid electronic control unit 50 is constructed as a microcomputer including a CPU 52, a ROM 54 that stores processing programs, a RAM 56 that temporarily stores data, input and output ports (not shown), and a communication port (not shown). The hybrid electronic control unit 50 receives, via its input port, motor temperatures Tm1 and Tm2 from temperature sensors 60 and 62 respectively attached to the motors MG1 and MG2, an outside air temperature Tout from an outside air temperature sensor 64 located outside the front of the hybrid vehicle 10, a gearshift position SP or a current setting position of a gearshift lever 71 from a gearshift position sensor 72, an accelerator opening Acc or the driver's depression amount of an accelerator pedal 73 from an accelerator pedal position sensor 74, a brake pedal position BP or the driver's depression amount of a brake pedal 75 from a brake pedal position sensor 76, and a vehicle speed V from a vehicle speed sensor 78. The hybrid electronic control unit 50 outputs, via its output port, driving signals to the oil pump 46. The hybrid electronic control unit 50 establishes communication with the engine ECU 14 and with the motor ECU 20 via its communication port to transmit diverse control signals and data to and from the engine ECU 14 and the motor ECU 20.

The hybrid vehicle 10 of the embodiment thus constructed sets a torque demand to be output to the driveshaft based on the vehicle speed V and the accelerator opening Acc corresponding to the driver's depression amount of the accelerator pedal 73 and controls the operations of the engine 14 and the motors MG1 and MG2 to ensure output of a required power equivalent to the torque demand to the driveshaft. The operation control of the hybrid vehicle 10 is not characteristic of the invention and is thus not specifically described in the specification hereof.

In the structure of this embodiment, the cooling device for the motors includes the motor cooling circulation system 40 having the oil circulation path 42, the oil cooler 44, and the oil pump 46, the temperature sensors 60 and 62 attached to the motors MG1 and MG2, the outside air temperature sensor 64, and the hybrid electronic control unit 50.

Figure 2:
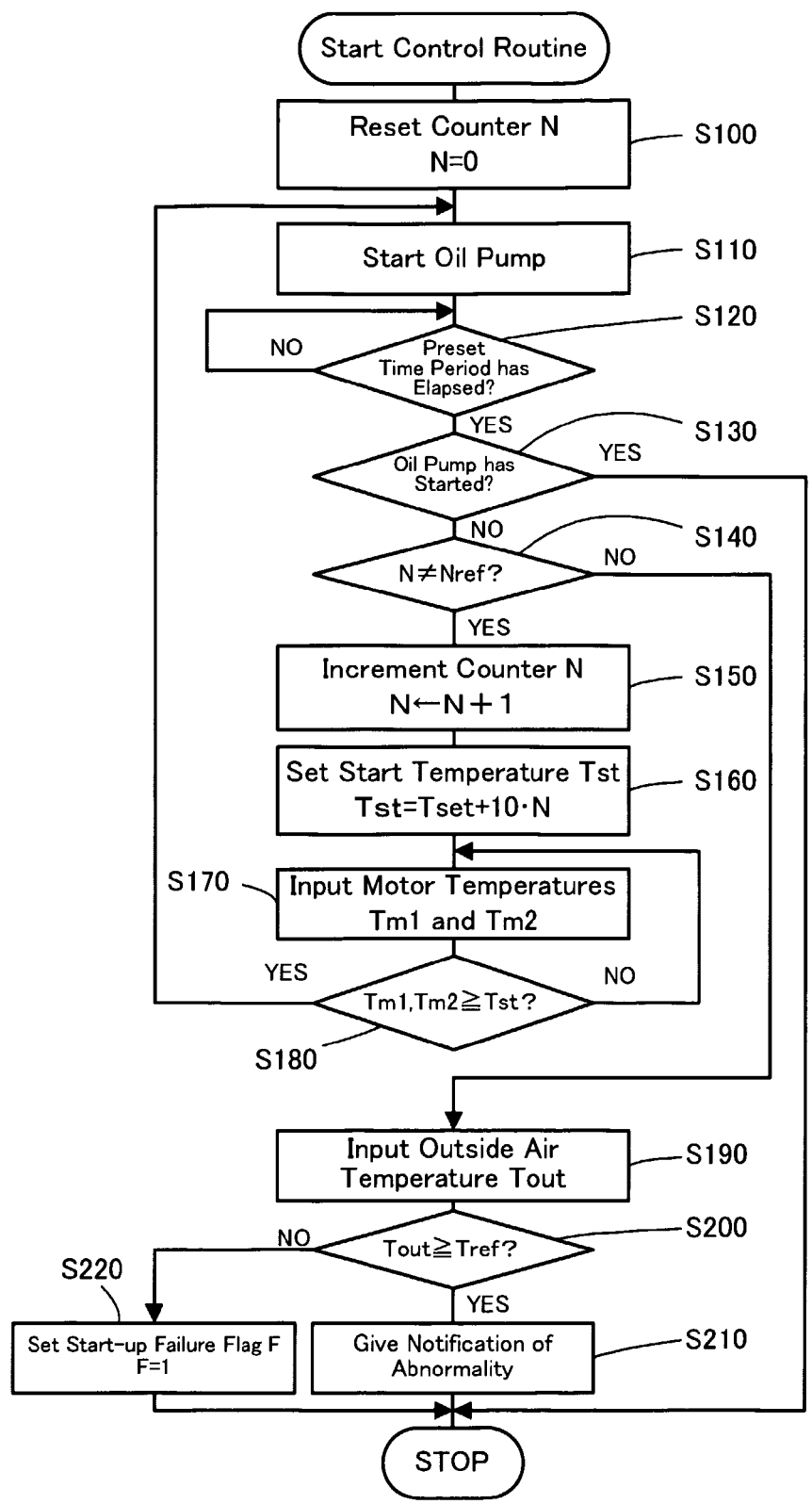
FIG. 2 is a flowchart showing a start control routine executed by a hybrid electronic control unit included in the hybrid vehicle.

The description regards the operations of the cooling device of the embodiment constructed as described above. FIG. 2 is a flowchart showing a start control routine executed by the hybrid electronic control unit 50 at a start of the oil pump 46. In the cooling device of the embodiment, the hybrid electronic control unit 50 executes this start control routine when either of the motor temperatures Tm1 and Tm2 of the motors MG1 and MG2 measured by the temperature sensors 60 and 62 reaches an initial starting temperature Tset, for example, 100° C. or 120° C.

In the start control routine of FIG. 2, the CPU 52 of the hybrid electronic control unit 50 first resets a counter N to 0 (step S100), performs a start-up process for a start of the oil pump 46 (step S120), waits for elapse of a preset time period (step S120), and specifies success or failure in start of the oil pump 46 (step S130). The success or failure in start of the oil pump 46 is specified after elapse of the preset time period, since it takes some time to complete a start of the oil pump 46 in response to a start command of the oil pump 46. The flow of oil circulating through the oil circulation path 42 in the motor cooling circulation system 40 has the higher viscosity at lower temperatures to increase the resistance in circulation through the oil cooler 44. The increased resistance of the oil flow may cause failure in start of the oil pump 46. The oil pump 46 naturally can not start in the event of a damage or abnormality in the oil pump 46 or in the event of failed power supply to the oil pump 46. The start control routine of this embodiment specifies the failure in start of the oil pump 46 caused by any of these reasons at step S130. The oil pump 46 immediately starts unless the outside air temperature is significantly low or unless any abnormality arises in the oil pump 46 or in the power supply to the oil pump 46. In response to specification of the success in start of the oil pump 46 at step S130, the CPU 52 immediately exits from this start control routine of FIG. 2.

In the event of a failure in start of the oil pump 46 caused by any reason at step S130, on the other hand, the CPU 52 determines whether the counter N is still lower than a preset reference value Nref (step S140). When the counter N is still lower than the preset reference value Nref, the CPU 52 increments the counter N by one (step S150) and adds the tenfold counter N to the initial starting temperature Tset to set a starting temperature Tst (step S160). The CPU 52 waits until either of the motor temperature Tm1 and Tm2 input from the temperature sensors 60 and 62 reaches the starting temperature Tst (steps S170 and S180) and goes back to step S110 to perform the start-up process again for a start of the oil pump 46. In the case of specification of the failure in start of the oil pump 46 at step S130, the start control routine repeatedly performs the start-up process for a start of the oil pump 46 at the timings of rise in either of the motor temperatures Tm1 and Tm2 by every 10° C. from the initial starting temperature Tset until specification of the success in start of the oil pump 46. For example, the start control routine repeatedly performs the start-up process for a start of the oil pump 46 at the timings of rise in either of the motor temperatures Tm1 and Tm2 from the initial starting temperature Tset of 120° C. to 130° C., 140° C., and 150° C. until specification of the success in start of the oil pump 46. In this manner, the start-up of the oil pump 46 is tried at the timings of rise in either of the motor temperatures Tm1 and Tm2 by every 10° C. The flow of oil having the high viscosity at the low outside air temperature is gradually heated up by the heat of the motors MG1 and MG2. The oil flow accordingly lowers its viscosity and enables a successful start-up of the oil pump 46. The reference value Nref determines the number of repetitions of the start-up process for a start of the oil pump 46. For example, the reference value Nref is set to 3 for 4 repetitions of the start-up process and is set to 4 for 5 repetitions of the start-up process. The success in start of the oil pump 46 may be specified at step S130 in the course of repetition of the start-up process for a start of the oil pump 46 at the timings of rise in either of the motor temperatures Tm1 and Tm2 by every 10° C. from the initial starting temperature Tset. Such specification represents achievement of the start of the oil pump 46 and terminates the start control routine.

When the counter N is not lower than the preset reference value Nref but reaches the preset reference value Nref at step S140 in the course of repetition of the start-up process for a start of the oil pump 46 at the timings of rise in either of the motor temperatures Tm1 and Tm2 by every 10° C. from the initial starting temperature Tset, the CPU 52 inputs the outside air temperature Tout from the outside air temperature sensor 64 (step S190). When the input outside air temperature Tout is not lower than a preset reference temperature Tref at step S200, the CPU 52 specifies the occurrence of an abnormality in the oil pump 46 or in the power supply to the oil pump 46 and gives notification of the occurrence of an abnormality (step S210). The notification may light up an error lamp on an instrument panel in front of the driver's seat. The CPU 52 then exits from this start control routine of FIG. 2.

The reference temperature Tref represents a temperature level at which the increased viscosity of the oil flow causes difficulty in start-up of the oil pump 46, and depends upon the performance of the oil pump 46, the properties of the oil used for the motor cooling circulation system 40, and the structure of the oil cooler 44. When the outside air temperature Tout is lower than the preset reference temperature Tref at step S200, on the other hand, the CPU 52 ascribes the failure in start of the oil pump 46 to the high viscosity of the oil flow due to the low outside air temperature Tout. The CPU 52 sets a start-up failure flag F to a value '1' (step S220) without notification of abnormality and exits from the start control routine of FIG. 2. Setting the start-up failure flag F effectively discriminates the failed start-up of the oil pump 46 due to the low outside air temperature Tout from the failed start-up of the oil pump 46 due to an abnormality in the oil pump 46 or in the power supply to the oil pump 46.

In the cooling device for the motors, the start control of this embodiment repeatedly performs the start-up process for a start of the oil pump 46 at the timings of rise in either of the motor temperatures Tm1 and Tm2 by every 10° C. from the initial starting temperature Tset. This start control heightens the potential for a successful start-up of the oil pump 46 even when the oil flow has the high viscosity at the relatively low outside air temperature. In the event of the failed start-up of the oil pump 46 by repetition of the start-up process, the start control does not specify the occurrence of an abnormality in the oil pump 46 or in the power supply to the oil pump 46 under the condition of the relatively low outside air temperature Tout. This arrangement effectively eliminates wrong detection of the abnormality in the oil pump 46 or in the power supply to the oil pump 46.

In the cooling device for the motors, the start control of the embodiment repeatedly performs the start-up process for a start of the oil pump 46 at the timings of rise in either of the motor temperatures Tm1 and Tm2 by every 10° C. from the initial starting temperature Tset. The degree of the temperature rise for each repetition of the start-up process is not limited to 10° C. but may be set to any arbitrary value. For example, the start-up process for a start of the oil pump 46 may be performed repeatedly at the timings of rise in either of the motor temperatures Tm1 and Tm2 by every 5° C. from the initial starting temperature Tset. Another possible modification may set multiple temperatures for execution of the start-up process for a start of the oil pump 46. The multiple temperatures may not have a fixed temperature interval. The temperature interval of the multiple temperatures may be narrowed at the higher temperature, for example, 120° C., 130° C., 137° C., and 142° C. The multiple temperatures may be set at random without any specific rule.

In the cooling device for the motors, even in the event of the failed start-up of the oil pump 46 by repetition of the start-up process, the start control of the embodiment does not specify the occurrence of an abnormality in the oil pump 46 or in the power supply to the oil pump 46 under the condition of the relatively low outside air temperature Tout. One possible modification of the start control may specify the occurrence of an abnormality in the oil pump 46 or in the power supply to the oil pump 46 independently of the outside air temperature Tout, in the event of the failed start-up of the oil pump 46 by repetition of the start-up process.

In the cooling device for the motors, in the event of the failed start-up of the oil pump 46 by repetition of the start-up process at the timings of rise in either of the motor temperatures Tm1 and Tm2 by every 10° C. from the initial starting temperature Tset, the start control of this embodiment specifies the occurrence of an abnormality in the oil pump 46 or in the power supply to the oil pump 46 at the outside air temperature Tout of not lower than the preset reference temperature Tref. The start control does not specify the occurrence of an abnormality in the oil pump 46 or in the power supply to the oil pump 46 at the outside air temperature Tout of lower than the preset reference temperature Tref. One possible modification of the start control may perform the start-up process for a start of the oil pump 46 only once when either of the motor temperatures Tm1 and Tm2 reaches the initial starting temperature Tset. In the event of the failed start-up of the oil pump 46, the modified start control specifies the occurrence of an abnormality in the oil pump 46 or in the power supply to the oil pump 46 at the outside air temperature Tout of not lower than the preset reference temperature Tref. The modified start control does not specify the occurrence of an abnormality in the oil pump 46 or in the power supply to the oil pump 46 at the outside air temperature Tout of lower than the preset reference temperature Tref.

Figure 3:
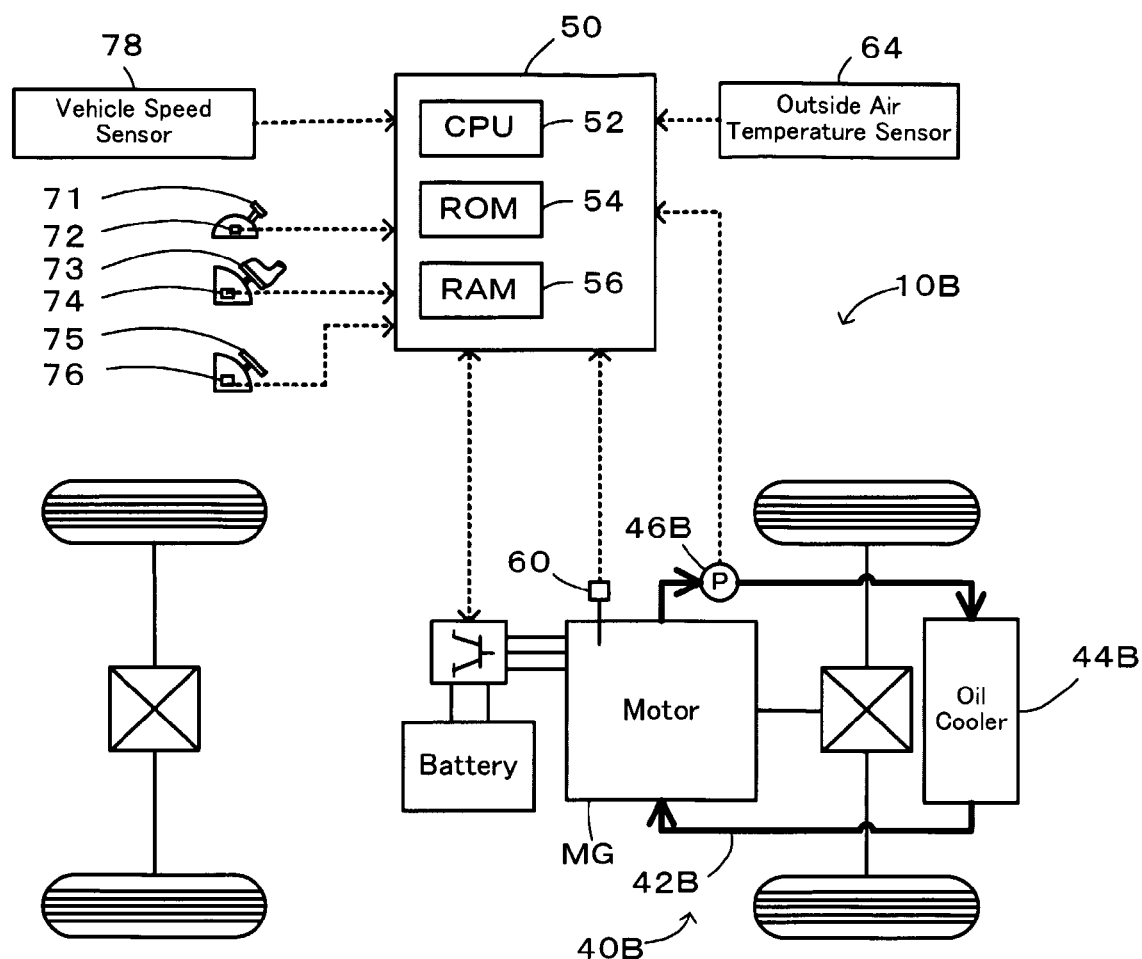
FIG. 3 schematically illustrates the configuration of a motor vehicle equipped with a cooling device in one modified example.

The embodiment regards the cooling device for cooling down the motors MG1 and MG2 in the hybrid vehicle 10 that is equipped with the engine 12, the planetary gear mechanism 16, and the motors MG1 and MG2. The cooling device of the invention may have any design to cool down motors and generators that are mounted on a vehicle of any configuration and are driven to output the driving power. For example, a cooling device of a modified example is mounted on a motor vehicle 10B shown in FIG. 3 and is activated to cool down a driving motor MG. The cooling device of this modified example has a motor cooling circulation system 40B. The motor cooling circulation system 40B includes an oil cooler 44B that is located in a front portion of the motor vehicle 10B, an oil circulation path 42B that circulates a flow of oil between the oil cooler 44B and the motor MG, and an oil pump 46B that pressure feeds the oil flow from the motor MG to the oil cooler 44B.

The embodiment regards the cooling device for cooling down the motors MG1 and MG2 mounted on the hybrid vehicle 10. The technique of the invention may also be actualized as a control method of the cooling device for cooling down the motors MG1 and MG2 mounted on the hybrid vehicle 10 or by an abnormality specification method at a start of the cooling device.

The embodiment and its modifications discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is preferably applicable to manufacturing industries of cooling devices for motors and other relevant industries.

The invention claimed is:
1. A cooling device that supplies a flow of cooling oil to cool down a motor mounted on a vehicle and driven to output driving power, said cooling device comprising:
 a heat exchange unit configured to cool down the flow of cooling oil through heat exchange with outside air;
 a pressure feed unit that is provided in a cooling oil circulation path formed between the motor and the heat exchange unit, the pressure feed unit configured to pressure feed the flow of cooling oil and circulate the flow of cooling oil through the cooling oil circulation path;
 an outside air temperature measurement unit configured to measure outside air temperature;
 a motor temperature measurement unit configured to measure temperature of the motor; and
 a start control module configured to perform a start-up control for a start of the pressure feed unit at a rise in measured temperature of the motor to a preset starting temperature and, in the event of a failed start-up of the pressure feed unit, to repeat the start-up control up to a predetermined number of times at every rise in measured temperature of the motor to one of multiple different temperatures, which are higher than the preset starting temperature, until a successful start-up of the pressure feed unit,
 wherein said start control module is configured to give notification of an abnormality in the event of the failed start-up of the pressure feed unit by the predetermined number of repetitions of the start-up control, and
 wherein said start control module is configured so as not to give notification of an abnormality even in the event of the failed start-up of the pressure feed unit by the predetermined number of repetitions of the start-up control, when the measured outside air temperature is lower than a preset low reference temperature.

2. A cooling device in accordance with claim 1, wherein the multiple different temperatures higher than the preset starting temperature have temperature differences of a preset temperature interval.

3. A cooling device that supplies a flow of cooling oil to cool down a motor mounted on a vehicle and driven to output driving power, said cooling device comprising:
 a heat exchange unit configured to cool down the flow of cooling oil through heat exchange with outside air;
 a pressure feed unit that is provided in a cooling oil circulation path formed between the motor and the heat exchange unit, the pressure feed unit configured to pressure feed the flow of cooling oil and circulate the flow of cooling oil through the cooling oil circulation path;
 a motor temperature measurement unit configured to measure temperature of the motor;
 an outside air temperature measurement unit configured to measure outside air temperature;
 a start control module configured to perform a start-up control for a start of the pressure feed unit at a rise in measured temperature of the motor to a preset starting temperature; and
 an abnormality specification module configured to specify, in the event of a failed start-up of the pressure feed unit by the start-up control of said start control module, occurrence of an abnormality at the measured outside air temperature of not lower than a preset low reference temperature, while not specifying the occurrence of an abnormality at the measured outside air temperature of lower than the preset low reference temperature.

4. A cooling device control method of controlling a cooling device, said cooling device including: a heat exchange unit that cools down a flow of cooling oil through heat exchange with outside air; and a pressure feed unit that is provided in a cooling oil circulation path formed between a motor, which is driven to output driving power of a vehicle, and the heat exchange unit to pressure feed the flow of cooling oil and circulate the flow of cooling oil through the cooling oil circulation path,
 said cooling device control method performing a start-up control for a start of the pressure feed unit at a rise in measured temperature of the motor to a preset starting temperature and, in the event of a failed start-up of the pressure feed unit, repeating the start-up control up to a predetermined number of times at every rise in measured temperature of the motor to one of multiple different temperatures, which are higher than the preset starting temperature, until a successful start-up of the pressure feed unit, said cooling device control method specifying occurrence of an abnormality in the event of the failed start-up of the pressure feed unit by the predetermined number of repetitions of the start-up control, and said cooling device control method not specifying the occurrence of an abnormality even in the event of the failed start-up of the pressure feed unit by the predetermined number of repetitions of the start-up control, when a measured outside air temperature is lower than a preset low reference temperature.

5. A cooling device control method in accordance with claim 4, wherein the multiple different temperatures higher than the preset starting temperature have temperature differences of a preset temperature interval.

6. An abnormality specification method of specifying an abnormality at a start of a cooling device, said cooling device including: a heat exchange unit that cools down a flow of cooling oil through heat exchange with outside air; and a pressure feed unit that is provided in a cooling oil circulation path formed between a motor, which is driven to output driving power of a vehicle, and the heat exchange unit to pressure feed the flow of cooling oil and circulate the flow of cooling oil through the cooling oil circulation path, said abnormality specification method comprising the steps of:

performing a start-up control for a start of the pressure feed unit at a rise in measured temperature of the motor to a preset starting temperature; and in the event of a failed start-up of the pressure feed unit by the start-up control, specifying occurrence of an abnormality at a measured outside air temperature of not lower than a preset low reference temperature, while not specifying the occurrence of an abnormality at the measured outside air temperature of lower than the preset low reference temperature.

* * * * *